(12) United States Patent
Andrews et al.

(10) Patent No.: US 7,581,390 B2
(45) Date of Patent: Sep. 1, 2009

(54) METHOD AND SYSTEM FOR IMPROVING SENSOR ACCURACY

(75) Inventors: Eric B. Andrews, Columbus, IN (US); Matthew L. Schneider, Seymour, IN (US)

(73) Assignee: Cummins Inc., Columbus, IN (US)

( * ) Notice: Subject to any disclaimer, the term of this patent is extended or adjusted under 35 U.S.C. 154(b) by 451 days.

(21) Appl. No.: 11/411,485

(22) Filed: Apr. 26, 2006

(65) Prior Publication Data

US 2007/0251224 A1    Nov. 1, 2007

(51) Int. Cl.
*F01N 3/10* (2006.01)

(52) U.S. Cl. .............. 60/301; 60/274; 60/276; 60/277; 60/285; 204/401; 204/427; 205/775; 205/780.5

(58) Field of Classification Search ............ 60/274, 60/276, 277, 285, 301; 204/401, 424, 427; 205/775, 780.5, 782
See application file for complete search history.

(56) References Cited

U.S. PATENT DOCUMENTS

| | | | |
|---|---|---|---|
| 5,482,013 A | 1/1996 | Andrews et al. | |
| 5,983,150 A | 11/1999 | Sasaki | |
| 6,301,878 B1 * | 10/2001 | Zhang et al. | 60/274 |
| 6,649,041 B2 * | 11/2003 | Hashimoto et al. | 205/785 |
| 6,685,807 B2 * | 2/2004 | Meier | 204/401 |
| 6,860,100 B1 | 3/2005 | Bidner et al. | |
| 7,343,734 B2 * | 3/2008 | Aliakbarzadeh et al. | 60/277 |
| 7,413,645 B2 * | 8/2008 | Scheffler | 205/775 |
| 7,418,853 B2 * | 9/2008 | Odendall | 73/1.06 |
| 2004/0103642 A1 | 6/2004 | Rosel et al. | |
| 2004/0187482 A1 | 9/2004 | Bidner et al. | |
| 2007/0125665 A1 * | 6/2007 | Kubinski et al. | 205/780.5 |

* cited by examiner

*Primary Examiner*—Tu M Nguyen
(74) *Attorney, Agent, or Firm*—Krieg DeVault LLP; J. Bruce Schelkopf, Esq.

(57) ABSTRACT

A method and system for improving sensor accuracy of diesel emissions is disclosed. The method and system comprises changing the sensor reading as a function of sensor age to provide a more accurate measure of the diesel emissions. By estimating the degree of sensor error and then providing a gain correction factor as a function of sensor age, a more accurate measure of the diesel emissions is provided.

23 Claims, 7 Drawing Sheets

FIG. 6

METHOD AND SYSTEM FOR IMPROVING SENSOR ACCURACY

FIELD OF THE INVENTION

The present invention relates generally to engines and more specifically to sensing emissions of such engines.

BACKGROUND OF THE INVENTION

The regulation of diesel emissions is becoming more and more stringent. The need for better closed loop control will be necessary in the future in order to meet the more demanding standards and on board diagnostics (OBD). One way in which the regulation of diesel emissions can be improved is by utilizing an NOx sensor system. A typical NOx sensor system consists of a sensor and sensing electronics box. The sensor is mounted in the exhaust in such a way so that it can measure the amount of NOx concentration in the diesel emissions and then send that information to a sensing electronics box.

As the sensor ages over time, the sensor changes such that the actual NOx concentration in the exhaust is different than NOx concentration measured by the sensor. This change is typically caused by fouling of the sensor's catalytic material.

Accordingly, what is needed is a system and method for compensating for the change is sensitivity of the NOx sensor, thereby both extending the useful life of the sensor and also providing more accurate readings during the life of the sensor. The present invention addresses such a need.

SUMMARY OF THE INVENTION

A method and system for improving sensor accuracy of diesel emissions is disclosed. The method and system includes changing the sensor reading as a function of sensor age to provide a more accurate measure of the diesel emissions. By estimating the degree of sensor error and then providing a gain correction factor as a function of sensor age, a more accurate measure of the diesel emissions is provided.

DETAILED DESCRIPTION

The present invention relates generally to engines and more specifically to sensing emissions of such engines. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
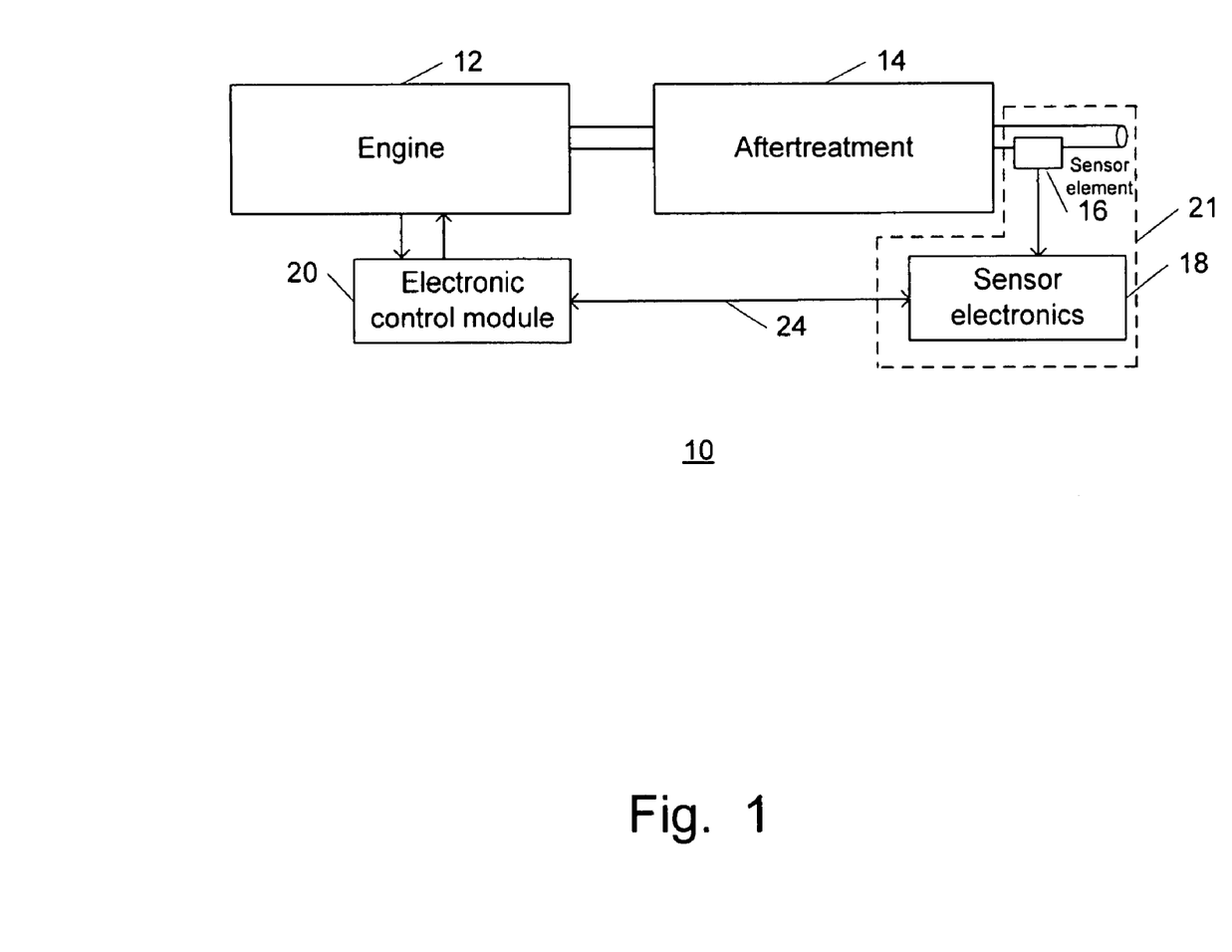
FIG. 1 is a simple block diagram of a first embodiment of a diesel engine system.

FIG. 1 is a simple block diagram of a first embodiment of a diesel engine system 10. The diesel engine system 10 comprises an engine 12 coupled to an aftertreatment unit 14. The engine 12 is controlled by an electronic control module (ECM) 20.

Figure 2:
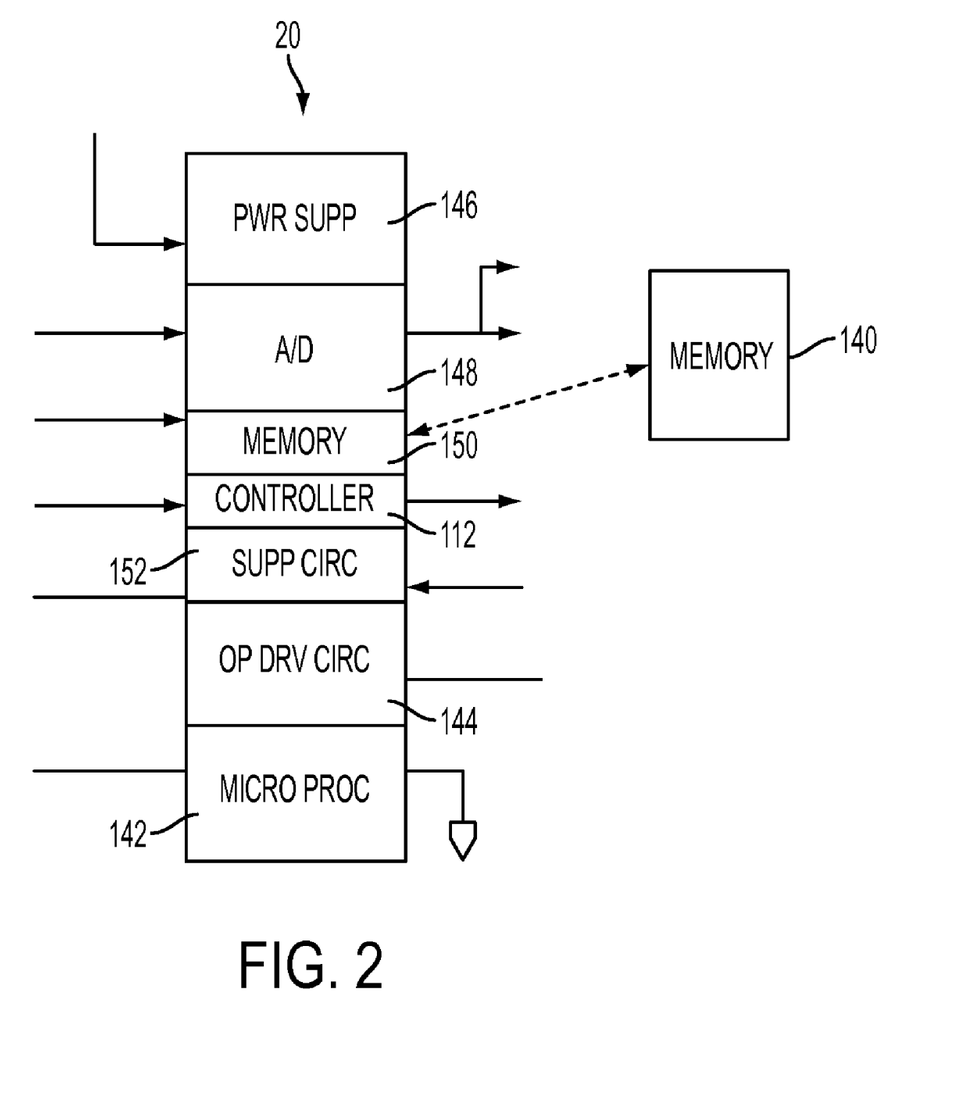
FIG. 2 is a diagram of an electronic control module.

FIG. 2 is a diagram of an electronic control module (ECM) 20. Referring to FIG. 2, the electronics control module 20 includes as its central component a controller 112. Controller 112 is a microcomputer including a microprocessor portion 42, an output driver portion 144 including output interface circuitry, a power supply portion 146, an analog-to-digital converter portion 148, a memory portion 150 and a supporting circuitry portion 152.

The microprocessor portion 142 runs software routines and manages the overall operation of the system 10. The microprocessor portion 142 may contain the analog-to-digital converter portion 148 for converting analog sensor signals to digital signals for further processing by the microprocessor portion 142. In an embodiment, microprocessor portion 142 of controller 112 is model number MPC 5554 by Freescale Corporation.

The memory portion 150 of controller 112 may include ROM, RAM, RPROM, EEPROM, Flash PROM and any other reusable type of memory known to those skilled in the art. The memory portion 150 may be further supplemented by memory 140 connected thereto as shown by a dashed-line connection. Memory 140 may include any of the memory features described with respect to memory portion 150. Memory 140 may also be used to supplant memory portion 150 if controller 112 lacks a memory portion 150 or if memory portion 150 provides inadequate storage. Finally, the microprocessor portion 142 may include sufficient memory (including ROM and RAM) to obviate the need for memory portion 150 and/or supplemental memory 140.

The power supply portion 146 of controller 112 receives electrical power from the battery 124 (not shown) through key switch 122 (not shown) when key switch 122 is in the "on" position, and supplies electrical power to the various controller portions as well as supporting circuitry which may be added to the system 10. The output driver portion 144 of controller 112 supplies power output signals capable of driving relays, switches and the like.

The supporting circuitry portion 152 may include, for example, interface circuitry for conditioning input signals, a UART, load dump and electrostatic discharge (ESD) protection circuitry, buffer circuitry and other circuitry commonly associated with microcomputers.

The ECM 20 communicates with a sensor system 21 to detect and control exhaust emissions. The sensor system 21 includes sensor electronics 18 and a sensor element 16. The sensor element 16 is mounted in the exhaust so that it can measure the amount of NOx concentration in the diesel emissions. Information from the sensor element 16 is provided to the sensor electronics 18 via the controller area network (CAN) bus or SAE-J-1939 bus 24. The sensor electronics 18 sends and receives information to and from the electronic control module 20.

The sensor electronics 18, for example, may along with other functions provide an onboard diagnosis (OBD) system. The OBD system contained within the sensor electronics performs at least three functions based on the data received from the sensor element 16: (1) detects short circuits and open wires, and delivers an error message on the data link to the electronic control module; (2) performs analysis of the exhaust gas aftertreatment system to recognize static and dynamics sensor failures; and (3) detects NOx emissions. The sensor system 21 and sensor system 102 could be implemented utilizing a system such as the Smart NOx-Sensor (SNS) system, manufactured by NGK Insulators, Ltd. and Siemens VDO Automotive.

Figure 3A:
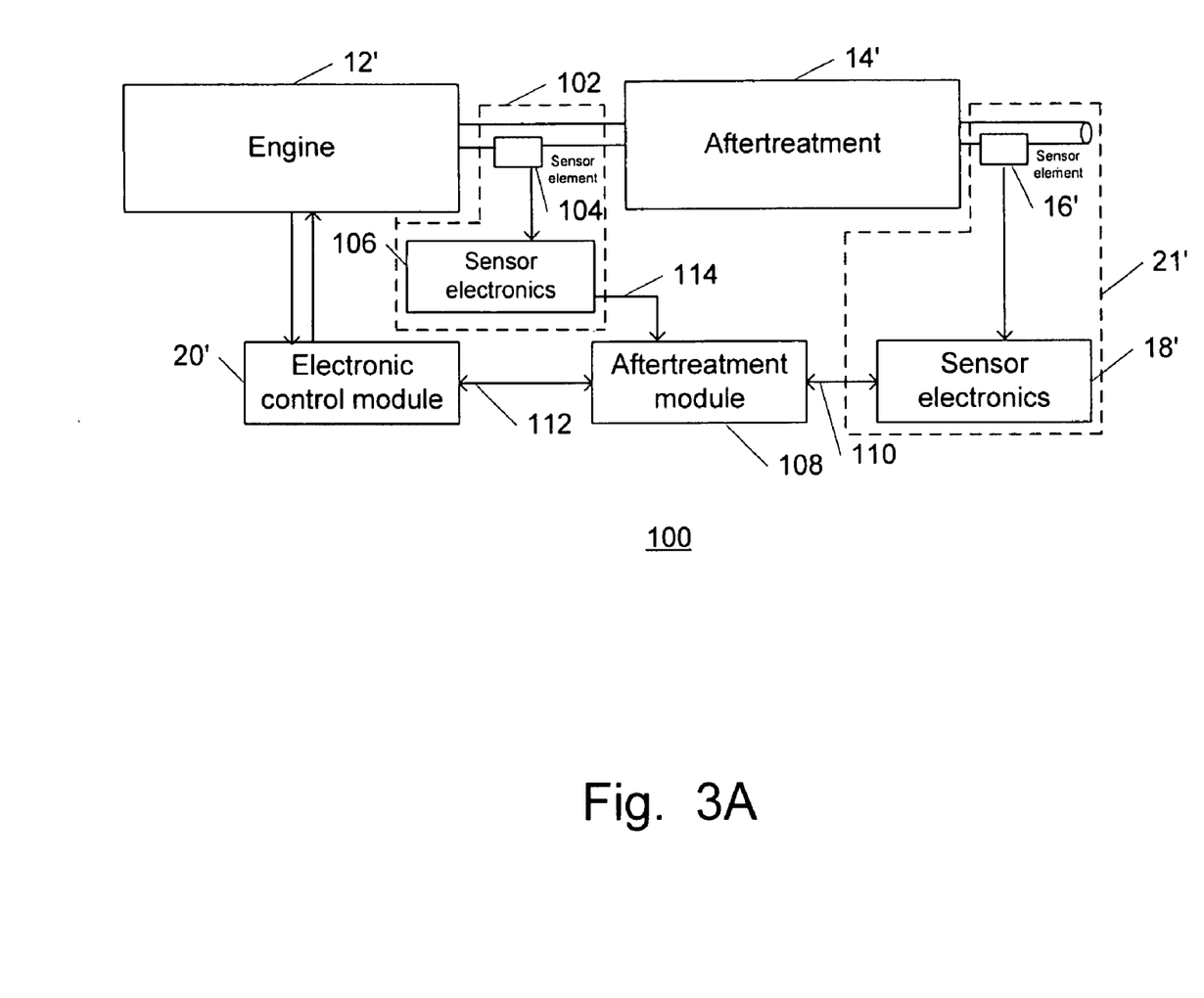
FIG. 3A is a block diagram of a second embodiment of a diesel engine system.
Figure 3B:
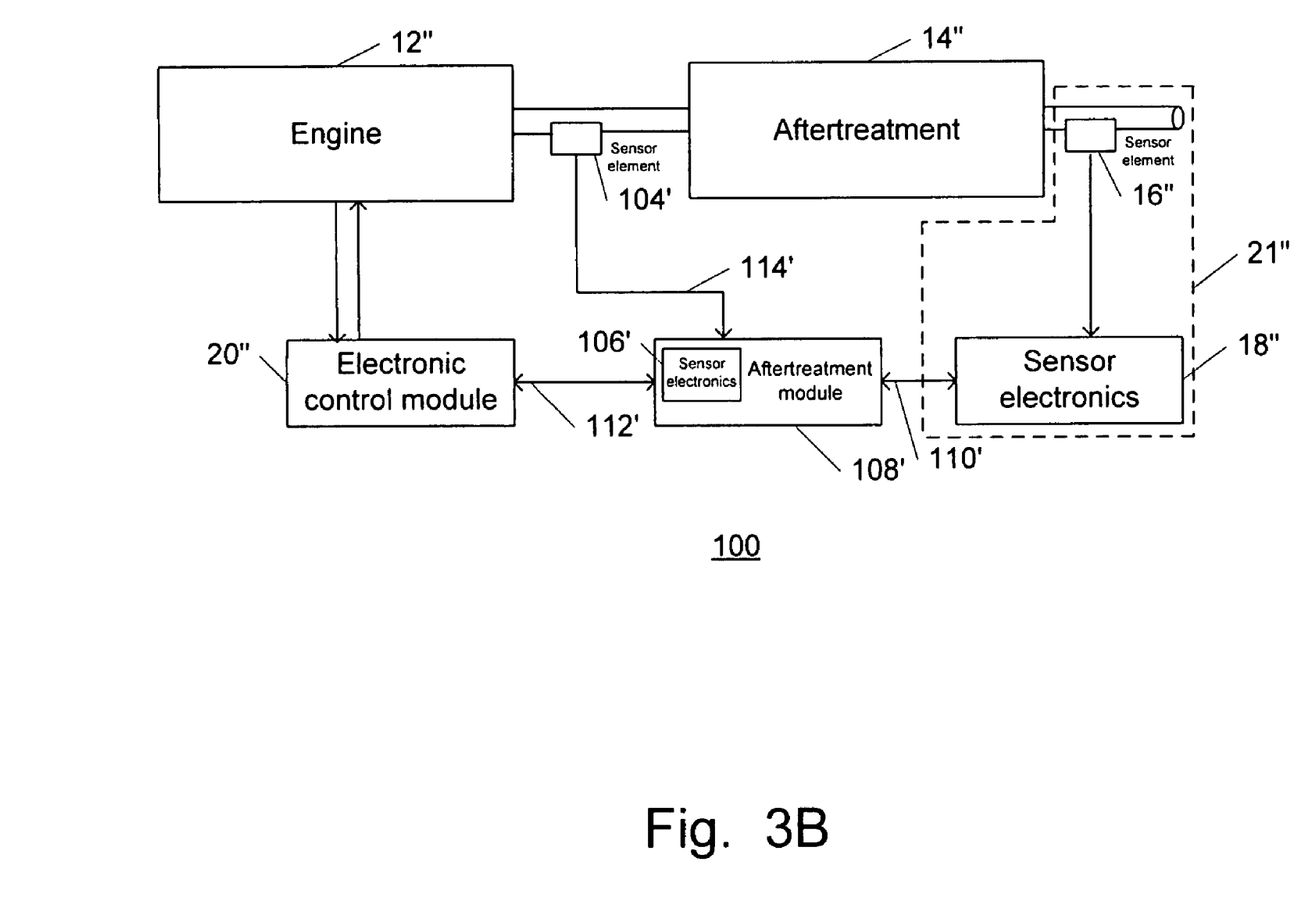
FIG. 3B is a block diagram of a third embodiment of a diesel engine system.

FIG. 3A is a block diagram of a second embodiment of a diesel engine system 100. In addition to the elements described in the first embodiment in FIG. 1, this second embodiment includes a second sensor system 102 and would include an aftertreatment module (ATM) 108 and sensor electronics 106. The sensor system 102 also includes a sensor element 104. The sensor system 102 could be similarly implemented utilizing the above-identified SNS system. The aftertreatment module 108 is coupled to sensor system 21', sensor system 102 and electronic control module 20' via the CAN buses (Europe) or SAE-J-1939 buses (US) 110, 112 and 114. FIG. 3B is a block diagram of a third embodiment of a diesel engine system 100. The system 100' works substantially the same as system 100 described in FIG. 3A except that the sensor electronics 106' is integrated within the ATM 108'. By so doing, the circuitry utilized on the diesel engine is substantially simplified.

Figure 4:
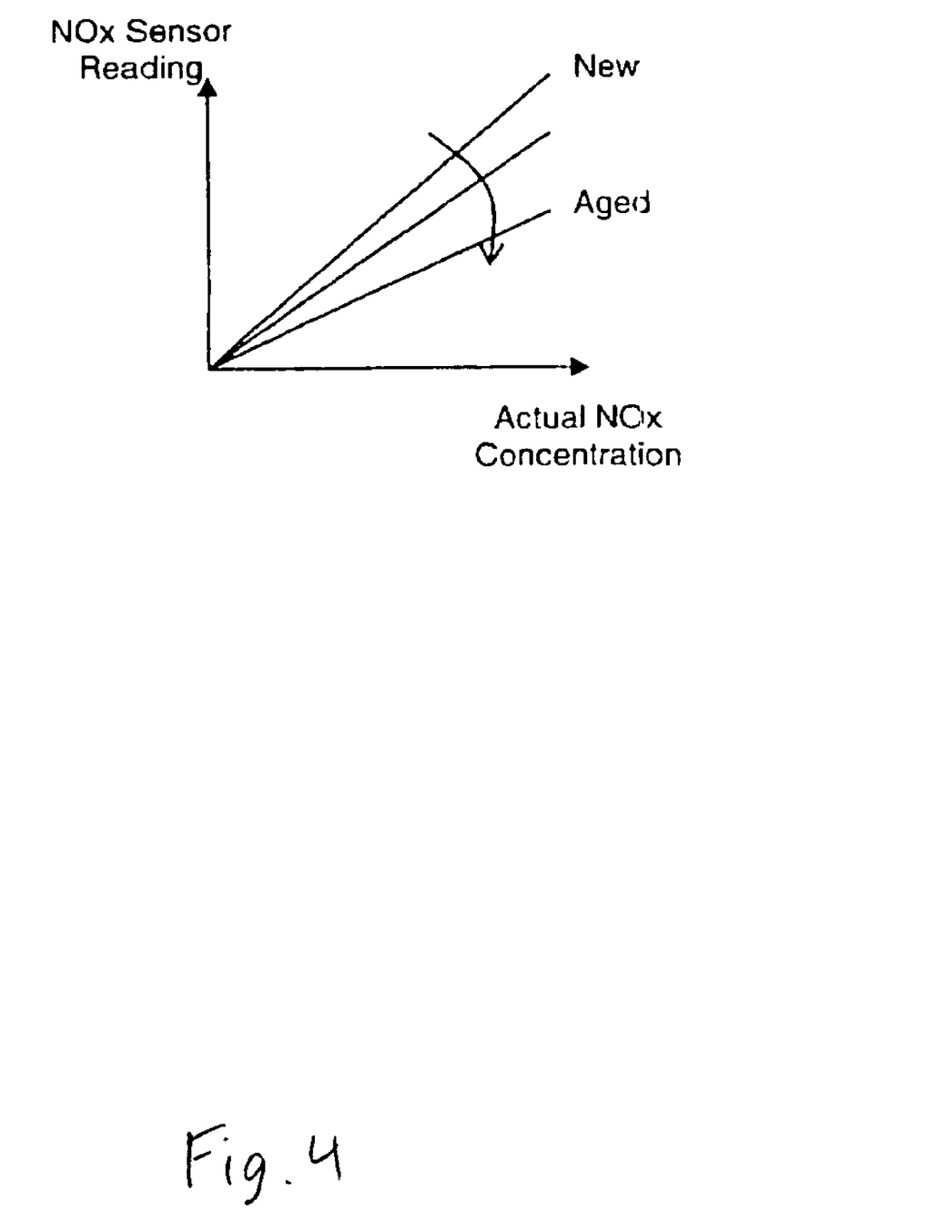
FIG. 4 is a diagram showing loss of sensitivity over time.

The aftertreatment module 108, 108' may perform the following functions:
- Receives and processes the 2 NOx sensor inputs
- Computes current efficiency of the SCR cat
- Computes the current max efficiency of the catalytic convertor
- Computes the desired urea dosing rate
- Controls the urea doser
- Performs sensor diagnostics
- Performs urea doser diagnostics
- Communicates with the ECM (info like system status, diagnostics, control parameters)
- Computes the ammonia storage based upon current conditions and adaptive storage model
- Calculates the sensor correction based upon engine hours and the total accumulated NOx As discussed previously, the sensor (either sensor element 16 of FIG. 1 or sensor elements 16', 16" and sensor elements 104, 104' of FIGS. 3A and 3B) oftentimes does not meet durability targets. Replacement of the sensor elements is an expensive and time-consuming process. The durability issue is caused by the sensor element's loss of sensitivity over time, due to fouling of the sensor element's catalytic material. FIG. 4 is a diagram which shows that the loss of sensitivity results in a change in the sensor gain, thereby causing the sensor to provide inaccurate information as it ages.

Figure 5:
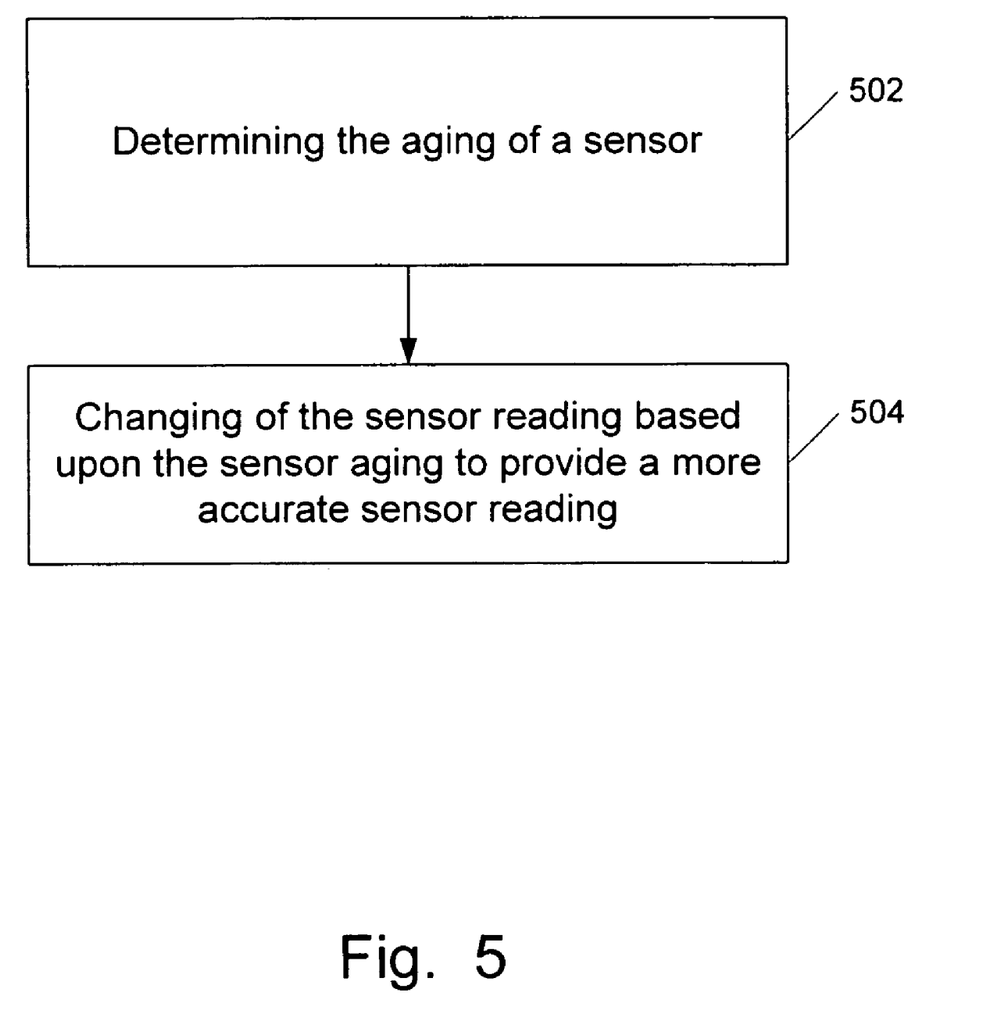
FIG. 5 is a flow chart of a system for improving the accuracy in accordance with the present invention.

FIG. 5 is a simple flow chart of a system for improving the accuracy of a sensor in accordance with the present invention. In a preferred embodiment the system would be implemented via a software routine in the electronic control module of the engine system. The system comprises first determining the aging of a sensor, via step 502, and the changing of the sensor reading based upon the sensor aging to provide a more accurate sensor reading, via step 504.

In the embodiment of FIG. 1, the sensor element 16 is tracked for aging. In the embodiments of FIGS. 3A and 3B, both sensor elements 16', 16" and 104, 104' are tracked for aging. In so doing a more accurate reading is performed on the emissions from the engine.

In a system and method in accordance with the present invention, the aging of the sensors is taken into account and compensated for when providing emissions reading. In so doing a more accurate emissions reading is provided. To describe the present invention in more detail refer now to the following description in conjunction with the accompanying figures.

Figure 6:
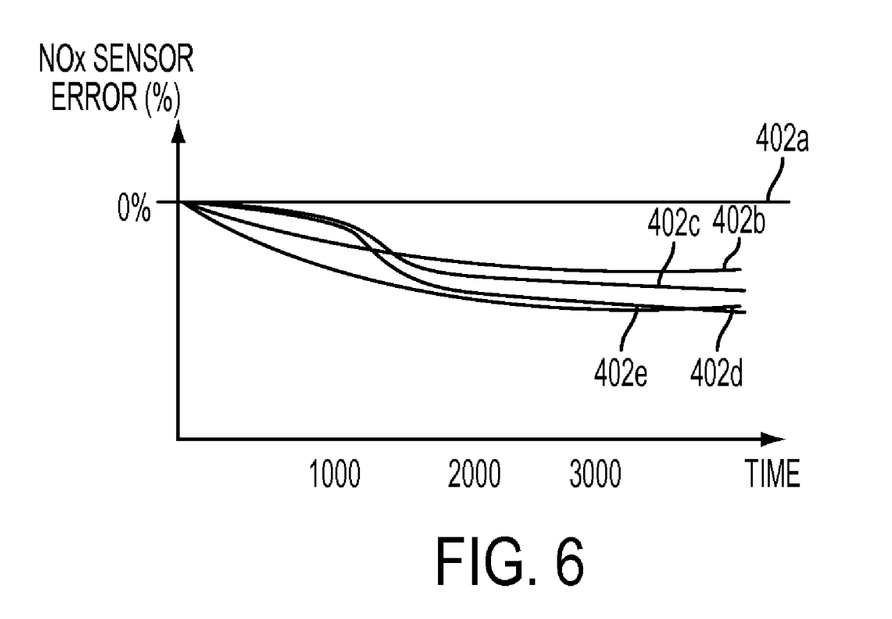
FIG. 6 is a diagram which illustrates testing of a plurality of sensors over a predetermined time period.

FIG. 6 is a diagram which illustrates testing for a plurality of sensors over a predetermined time period (3000 hours). The diagram shows an example of NOx sensor error in percentage and units of time. The degree to which aging affects the accuracy of the sensor is determined by collecting samples from a plurality of sensors which are tested during an established time frame. Each line 402a-402e in FIG. 6 shows the sampling information from a particular equivalent sensor as it is tested over a period of time. The sampled information from all of the equivalent sensors may be utilized to determine the adjustment of gain which is needed at different points in the use and aging cycle of the sensors. The sampling information may be averaged, may be the mean of all of the equivalent sensors' aging, linear, exponential, logarithmic, or some other point related to the equivalent sensor readings may be utilized to provide the estimated sensor reading.

As can be seen in FIG. 6, the loss of sensitivity for a plurality of equivalent sensors eventually levels off after a few thousand hours. Sensor gain adjustment is therefore a function of the exhaust concentration and time, as shown by the following equation:

The gain correction factor (G)=f (accumulated NOx concentration, total exhaust mass flow/time). The NOx concentration in the exhaust can then be estimated and integrated in the electronic control module (ECM). Thereafter this information is utilized to adjust the sensor reading based upon its age.

In one embodiment, periodically the ECM will query the sensor via the sensor electronics via a CAN (controller area network) link to receive sensor operating hours. Having the sensor keep track of its on time and communicating that information to the ECM eliminates the potential algorithm problem if the sensor is replaced without the ECM's knowledge.

The corrected sensor reading can be calculated as:

$NOx_{actual} = NOx_{sensor} \times G$, where emissions $NOx_{actual}$ is actual emissions, $NOx_{sensor}$ is the emissions reading by the sensor and G is the before-mentioned gain factor.

Accordingly, an algorithm in accordance with one embodiment compensates for the sensor loss of sensitivity by increasing the sensor reading as a function of sensor age. By having the ECM and/or ATM compensate for errors caused by aging of the sensor, more consistently accurate readings can be received from the sensor as it ages. As a result, diesel NOx emissions are more effectively reduced, and costs associated with replacement of the sensor are minimized, as well as the time and costs caused by replacing the sensors more frequently.

Although the embodiment of a sensor element utilized in the diesel engine system described in the present application shows a loss of sensitivity over time, one of ordinary skill in the art readily recognizes the sensor element could change in sensitivity in many ways and that such ways would be within the spirit and scope of the present invention. For example, the sensor element could increase in sensitivity over a period of time, or could, for example, vary in sensitivity in a predictable way, or the sensitivity could vary in a way that could easily be measured and compensated.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for improving sensor accuracy when measuring emissions from a vehicle comprising:
   changing at least one sensor reading as a function of sensor age to provide a more accurate measure of the emissions; wherein the changing step implemented in accordance with the following equation:
   $NOx_{actual} = NOx_{sensor} \times G$, where $NOx_{actual}$ comprises the actual emissions, $NOx_{sensor}$ comprises the emissions as measured by the sensor and G comprises a gain correction factor; wherein the gain correction factor is determined by estimating the amount of accumulated NOx concentration over a predetermined time period of sensor operation.

2. The method of claim 1 wherein the changing step comprises increasing at least one sensor reading as a function of sensor age.

3. The method of claim 1 wherein the changing step comprises decreasing at least one sensor reading as a function of sensor age.

4. The method of claim 1 wherein the gain correction factor is related to accumulated NOx concentration on the sensor.

5. The method of claim 1 wherein the gain correction factor is related to the time that the sensor is on.

6. The method of claim 1 wherein the gain correction factor is related to the accumulated NOx concentration of the engine and the time that the sensor is on.

7. The method of claim 1 wherein the estimating amount $NO_x$ concentration over a predetermined time period of sensor operation comprises utilizing test results of a predetermined number of equivalent sensors to determine an estimate of a sensor sensitivity at different times of sensor aging.

8. An engine system comprising:
   an engine;
   an aftertreatment unit coupled to the engine for treating emissions;
   a sensor system, wherein the sensor system includes at least one sensor; and
   an electronic control module in communication with the sensor system, wherein the module includes a mechanism for changing the at least one sensor reading as a function of the age of the at least one sensor; wherein the changing step implemented in accordance with the following equation:
   $NOx_{actual} = NOx_{sensor} \times G$, where $NOx_{actual}$ comprises the actual emissions, $NOx_{sensor}$ comprises the emissions as measured by the sensor and G comprises a gain correction factor; wherein the gain correction factor is determined by estimating the amount of accumulated NOx concentration over a predetermined time period of sensor operation.

9. The engine system of claim 8 wherein the changing step comprises increasing at least one sensor reading as a function of sensor age.

10. The engine system of claim 8 wherein the changing step comprises decreasing at least one sensor reading as a function of sensor age.

11. The engine system of claim 8 wherein the gain correction factor is related to accumulated NOx concentration on the sensor.

12. The engine system of claim 8 wherein the gain correction factor is related to the time that the sensor is on.

13. The engine system of claim 8 wherein the gain correction factor is related to the accumulated NOx concentration of the engine and the time that the sensor is on.

14. The engine system of claim 8 wherein the estimating amount of $NO_x$ concentration over a predetermined time period of sensor operation comprises utilizing test results of a predetermined number of equivalent sensors to determine an estimate of a sensor sensitivity at different times of sensor aging.

15. The engine system of claim 8 wherein the sensor system comprises a first sensor for detecting emissions of the aftertreatment system; and a first sensor electronics coupled to the first sensor.

16. The engine system of claim 15 which includes an aftertreatment module for communicating with the first sensor electronics and the electronic control module and wherein the sensor system further includes a second sensor at an engine port; and a second sensor electronics coupled to the second sensor and to the aftertreatment module.

17. A computer readable medium containing program instructions for improving sensor accuracy wherein measuring emissions from a vehicle comprising:
   changing at least one sensor reading as a function of sensor age to provide a more accurate measure of the emissions; wherein the changing step is implemented in accordance with the following equation:
   $NOx_{actual} = NOx_{sensor} \times G$, where $NOx_{actual}$ comprises the actual emissions, $NOx_{sensor}$ comprises the emissions as measured by the sensor and G comprises a gain correction factor; wherein the gain correction factor is determined by estimating the amount of accumulated NOx concentration over a predetermined time period of sensor operation.

18. The computer readable medium of claim 17 wherein the changing step comprises increasing at least one sensor reading as a function of sensor age.

19. The computer readable medium of claim 17 wherein the changing step comprises decreasing at least one sensor reading as a function of age.

20. The computer readable medium of claim 17 wherein the gain correction factor is related to accumulated NOx concentration on the sensor.

21. The computer readable medium of claim 17 wherein the gain correction factor is related to the time that the sensor is on.

22. The computer readable medium of claim 17 wherein the gain correction factor is related to the accumulated NOx concentration of the engine and the time that the sensor is on.

23. The computer readable medium of claim 17 wherein the estimating amount $NO_x$ concentration over a predetermined time period of sensor operation comprises utilizing test results of a predetermined number of equivalent sensors to determine an estimate of a sensor sensitivity at different times of sensor aging.

* * * * *